UNITED STATES PATENT OFFICE.

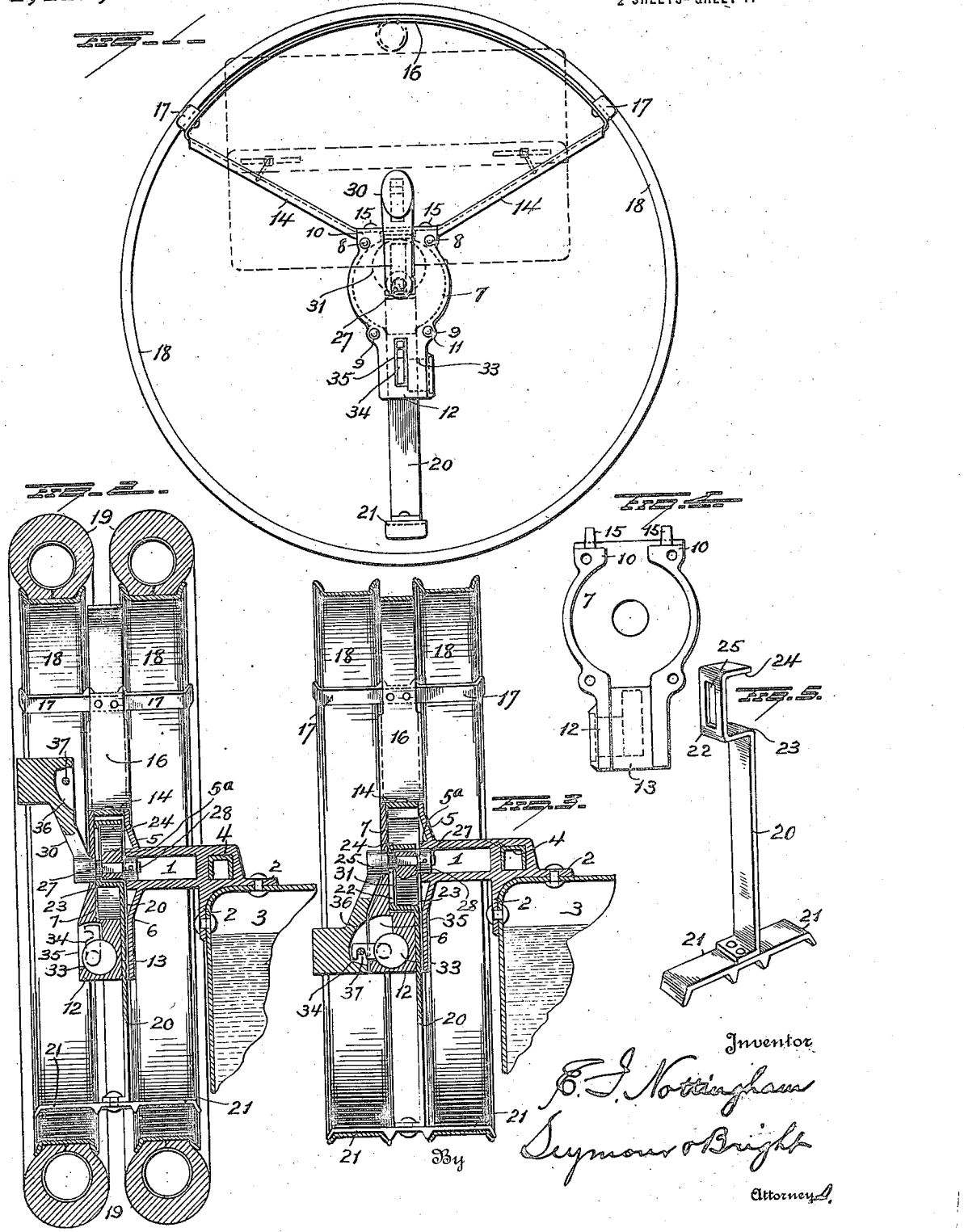

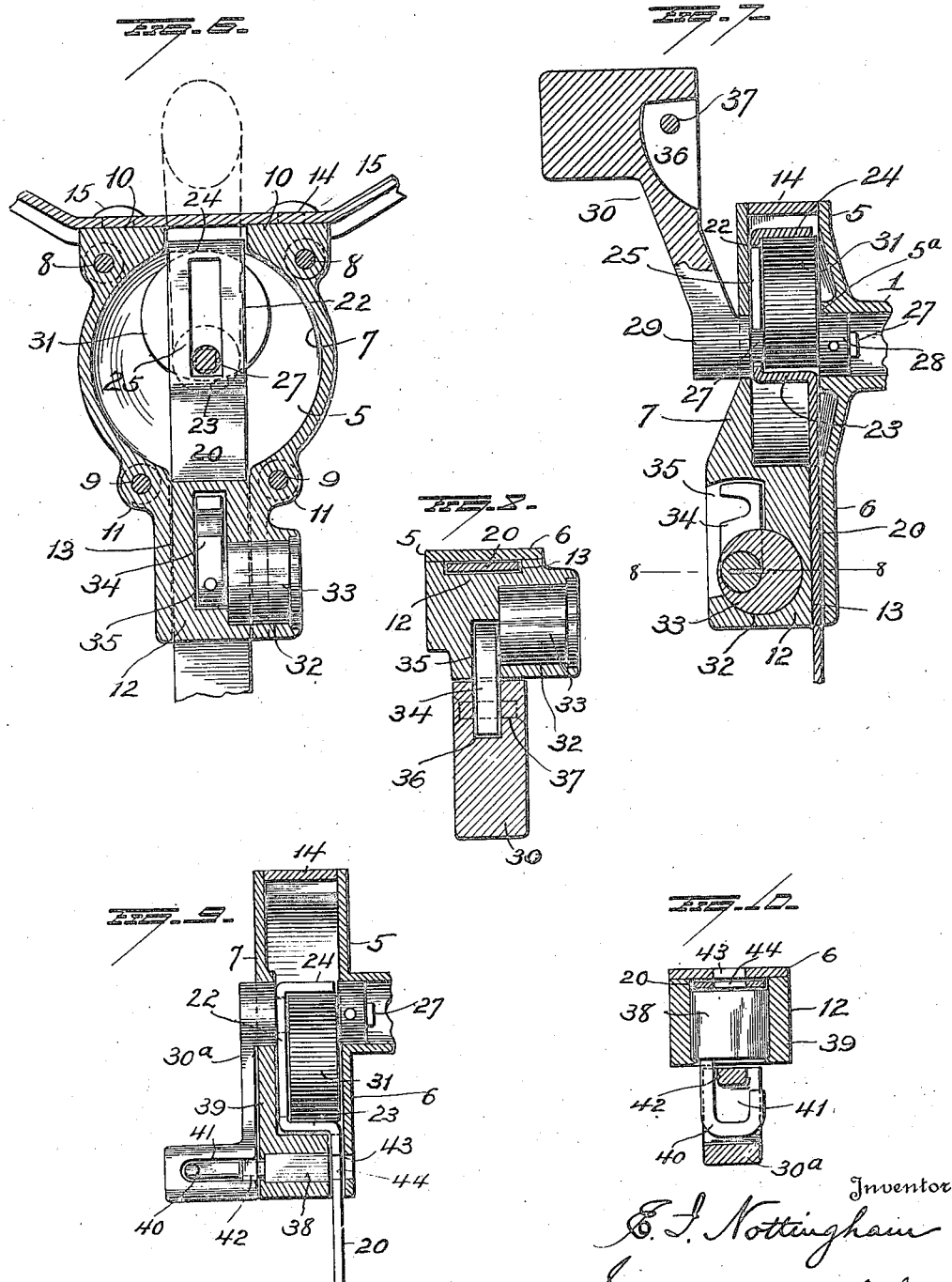

EDWIN I. NOTTINGHAM, OF WASHINGTON, DISTRICT OF COLUMBIA.

TIRE CARRIER.

1,412,703.  Specification of Letters Patent.  Patented Apr. 11, 1922.

Application filed February 3, 1921. Serial No. 442,088.

*To all whom it may concern:*

Be it known that I, EDWIN I. NOTTINGHAM, a citizen of the United States, and a resident of Washington, in the District of Columbia, have invented certain new and useful Improvements in Tire Carriers; and I do hereby declare the following to be a full, clear, and exact description of the invention, such as will enable others skilled in the art to which it appertains to make and use the same.

This invention relates to rim and tire carriers, and more particularly to improved means for supporting spare tires and rims on automobiles and for locking the same in place, one object of this invention being to provide a strong, and simple structure for the purpose stated, in which the locking means shall be incorporated in and form parts of the supporting and clamping devices.

A further object is to provide simple and efficient clamping devices for a rim and tire carrier, which shall be capable of easy manipulation and which shall be cooperable with locking means to effectually and securely lock the carrier to prevent possibility of unauthorized removal of tire and rim.

A further object is to provide a rim and tire carrier with clamping and locking means so constructed and arranged as to be protected from accident or the effects of the weather, and preclude possibility of being forced or otherwise released without the use of a proper key.

A further object is to so construct clamping and locking means for the carriers, that the use of jointed levers shall be obviated, and so that the various parts, including the lock per se shall not be separable, one from the other, but so that all of said parts shall comprise a complete and permanent structure.

With these and other objects in view, the invention consists in certain novel features of construction and combinations of parts as hereinafter set forth and pointed out in the claims.

In the accompanying drawings; Figure 1 is a view in elevation, showing the application of my improvements, with the parts in unlocked and released positions to permit removal of a rim and tire; Figure 2 is a sectional view of the structure shown in Figure 1, and in the same released positions; Figure 3, is a sectional view showing the locked positions of the parts; Figure 4, is a detail view of a portion of the supporting bracket; Figure 5, is a detail perspective view of the clamping member and shoe attached thereto; Figures 6 and 7, are enlarged sectional views taken at right angles to each other showing the clamping and locking devices,—both being shown in released positions; Figure 8, is a view on the line 8—8, of Figure 7, and Figures 9 and 10 illustrate a modification of the locking means.

1 represents a tubular bracket provided at one end with arms 2, 2, riveted to a fuel tank, 3, on an automobile, for supporting the carrier of which said bracket forms a part. The bracket may also be supported by a bar 4 passing through it and secured to the spring of the car. The bracket 1 is formed at one end with a head 5 having a central opening 5ª which may form one end of the bore of said bracket, and the bracket head 5 is provided with a depending arm 6. A housing 7 is secured to the bracket 1 by means of bolts or rivets 8, 9, passing through enlargements 10, 11, formed on said housing, and through suitable openings in the bracket head 5, and said housing is made with a depending arm 12, lying parallel with the pending bracket arm 6, and formed with a vertical guideway 13 for a purpose hereinafter explained.

The bracket 1 and housing 7, with their depending arms, cooperate to form a support for the rim engaging devices and for the operating and locking means for the same.

To the top of the housing 7, a tire-supporting frame 14 is secured preferably by rivets 15, made integral with the enlargements 10. This frame has a general triangular shape with its upper member 16, curved so as to be concentric with the axis of a tire to be supported. Arms or clips 17, are riveted to the curved member 16 of the frame 14, and project therefrom laterally in both directions so as to be in position to engage and hold two wheel rims 18 with tires 19 mounted thereon as shown in Figure 2, or without tires as shown in Figure 3.

A rim-clamping bar or member 20, is vertically movable through the guide-way 13 in the depending arm 12, of the housing 7, and to the lower end of said clamping member a transverse clip 21 is secured and adapted to engage the rims. The upper portion of the clamping bar or member 20 is located within the housing 7, and is bent to form an offset portion 22 forming two shoulders 23, 24, one above and spaced from the other, and said offset portion 22 is made with an enlarged slot 25.

A shaft 27 passes transversely through the housing and through the slot 25 of the clamping bar and to one end portion of said shaft, a collar 28, is rigidly secured, said collar having a bearing in the inner end portion of the tubular bracket 1. The hub 29 of a manually-operable crank 30 is rigid with the outer end of the shaft 27 (and may be made integral therewith if desirable) and has a bearing in a suitable opening in the outer wall of said housing. The shaft 27 carries within the housing, a cam 31 disposed between the shoulders 23, and 24, formed by the offset portion of the clamping bar 20, so that when said shaft is turned by manipulation of the crank 30, the locking bar will be moved vertically to cause the clips 21 to engage the wheel rims to clamp the rims in place or to cause said clips 21 to move away from the wheel rim and thus release the latter.

In order that the clamping means shall be inoperable by unauthorized persons to release the rims, I provide simple and convenient means for locking the hand crank 30 to prevent rotation of the cam by which movement of the clamping bar is controlled. For this purpose, the depending arm 12 of the housing 7, is made with an opening 32 in which a lock 33, (preferably of the pin-tumbler type) is secured and to the rotary member of this lock, a notched or hook-shaped latch 34 is secured, said latch being adapted, when the clamping means are in unlocked position, to enter a recess 35 in the housing arm 12 as shown in Figures 2 and 7. The hand crank 30 is provided with a recess 36 to receive the latch 34 and a pin 37 extends across said recess to receive the hook of the latch.

It will be apparent that if the hand crank be moved from the released position shown in Figures 1, 2, and 7, to the position shown in Figure 3, the cam 31 will be turned to cause the clamping bar to descend and the clips 21 to engage the tires as shown in Figure 3. The hand crank will become disposed alongside the depending arm 12 of the housing so that the recess 36 in said hand crank will align with the recess 35 in said arm 12 and receive the latch 34.

It will be observed that when the parts are in locked position, the hand crank will lie close to the arm 12 of the housing and that when the latch of the lock enters the recess 36 and engages in pin 37 therein, the parts will be securely locked, and the locking devices will be concealed.

Instead of employing a pin-tumbler lock arranged and adapted to operate as above described, I may enclose a pad-lock 38 in a recess in the lower portion of a housing bracket 39 as shown in Figures 9 and 10, and the shackle 40 of this lock is adapted to enter an open slot 41 in a hand crank 30ª when the latter is moved to the position shown in Figure 9, with the parts in the positions shown in Figures 9 and 10, the operator may grasp the shackle and move it causing its hook shaped portion to engage a cross bar 42 which extends across the slot 41 in the hand crank 30ª, and thus lock the hand crank and the parts which it controls in locked position.

Access for a key to the pad-lock may be had through slots 43, and 44, in the bracket arm 6, and the locking bar 20, as indicated in Figures 9 and 10.

Various changes may be made in the details of construction of my invention without departing from the spirit thereof or limiting its scope and hence I do not wish to restrict myself to the precise details set forth.

Having fully described my invention, what I claim as new and desire to secure by Letters Patent is:

1. The combination with a support, and a rim-engaging member carried thereby, of a locking bar entering said support and provided with rim-engaging means, a cam housed in said support and cooperable with said locking bar to move it longitudinally, a manually-operable member for operating said cam, and a key-operated lock housed in a part of said support and cooperable with said manually operable member.

2. The combination with a support, and a rim-engaging member carried thereby, of a locking bar entering said support and provided with rim-engaging means, a cam housed in said support and cooperable with said locking bar, a manually operable member for operating said cam, and means for locking said manually operable member to the support.

3. The combination with a support and rim-engaging means rigid therewith, of a locking bar having a part entering said support and provided in the latter with shoulders, a cam housed in said support and disposed between the shoulders of the locking bar, tire engaging means carried by the locking bar, a hand crank for operating said cam, and locking means between the hand crank and the said support, said locking means comprising a key-operated lock permanently carried by one of said parts and a keeper rigid with the other part.

4. In a device of the character described, the combination with a support and rim-engaging means rigid therewith, of a locking bar entering said support and provided at its outer end with rim-engaging means, said locking bar having oppositely disposed shoulders, a cam housed within said support and disposed between said shoulders, a crank for operating said cam and provided with a keeper, a key-operated lock housed in a part of the support and adapted to cooperate with the keeper carried by said crank.

In testimony whereof, I have signed this specification in the presence of two subscribing witnesses.

EDWIN I. NOTTINGHAM.

Witnesses:
R. S. FERGUSON,
G. F. DOWNING.